(12) United States Patent
Kounev et al.

(10) Patent No.: US 11,290,180 B1
(45) Date of Patent: Mar. 29, 2022

(54) ADAPTIVE BUFFER REGION FOR LINE-OF-SIGHT NETWORK PLANNING

(71) Applicant: AT&T Intellectual Property I, L.P., Atlanta, GA (US)

(72) Inventors: Velin Kounev, Weehawken, NJ (US); Arun Jotshi, Parsippany, NJ (US); Krystian Czapiga, Hillsborough, NJ (US); Yaron Kanza, Fair Lawn, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/095,131

(22) Filed: Nov. 11, 2020

(51) Int. Cl.
| | |
|---|---|
| *H04B 10/00* | (2013.01) |
| *H04B 10/073* | (2013.01) |
| *H04B 10/112* | (2013.01) |
| *H04W 16/18* | (2009.01) |
| *H04W 16/28* | (2009.01) |
| *H04J 14/00* | (2006.01) |

(52) U.S. Cl.
CPC ..... *H04B 10/0731* (2013.01); *H04B 10/1123* (2013.01); *H04B 10/1129* (2013.01); *H04W 16/18* (2013.01); *H04W 16/28* (2013.01)

(58) Field of Classification Search
CPC .......... H04B 1/00; H04B 7/00; H04B 7/015; H04B 7/24; H04B 10/00; H04B 10/11; H04B 10/112; H04B 10/1121; H04B 10/1123; H04B 10/1125; H04B 14/00; H04W 16/00; H04W 16/18
See application file for complete search history.

(56) References Cited

U.S. PATENT DOCUMENTS

| | | | |
|---|---|---|---|
| 2009/0319236 A1* | 12/2009 | Blaunshtein | .......... H04W 16/22 703/1 |
| 2016/0269911 A1* | 9/2016 | Cheng | .................... H04W 16/18 |
| 2021/0120518 A1* | 4/2021 | Ryabko | ............... H04W 84/045 |

* cited by examiner

*Primary Examiner* — Daniel G Dobson
(74) *Attorney, Agent, or Firm* — Amin, Turocy & Watson, LLP

(57) ABSTRACT

Architectures and techniques are presented that improve or enhance a network planning procedure such as by selecting a more efficient test buffer that is used to identify objects that might intersect a Fresnel zone between two transceivers. An improved test buffer (e.g., buffer region) can be one that is constructed from a plurality of rectangles situated along a line of sight of the two transceivers and that are oriented according to cardinal directions.

20 Claims, 10 Drawing Sheets

ADAPTIVE BUFFER REGION FOR LINE-OF-SIGHT NETWORK PLANNING

TECHNICAL FIELD

The present application relates generally to constructing an adaptive buffer region around a line-of-sight between two transceivers that closely approximates a Fresnel zone while enabling more efficient line-of-sight computations.

BACKGROUND

In wireless links of communication networks, often transmitters use frequencies that are blocked or obstructed by physical obstacles like buildings or trees. This includes fifth generation (5G) networks and microwave transmissions between communication towers. When planning such networks, it is important to take potential obstructions into account when selecting locations for the transceivers of a communication network. For example, when selecting locations for a pair of microwave transceivers (e.g., a receiver and a transmitter) that should be connected to one another, there should be a clear line-of-sight (LoS) between the transceivers on these towers, with no obstacles between them. Furthermore, there is a need to take Fresnel zones into account—a 3D buffer with a varying width around the LoS. For example, network planning typically attempts to verify that there are no geospatial entities that intersect the n-th Fresnel zone.

BRIEF DESCRIPTION OF THE DRAWINGS

Numerous aspects, embodiments, objects and advantages of the present application will be apparent upon consideration of the following detailed description, taken in conjunction with the accompanying drawings, in which like reference characters refer to like parts throughout, and in which.

DETAILED DESCRIPTION

Overview

Figure 1:
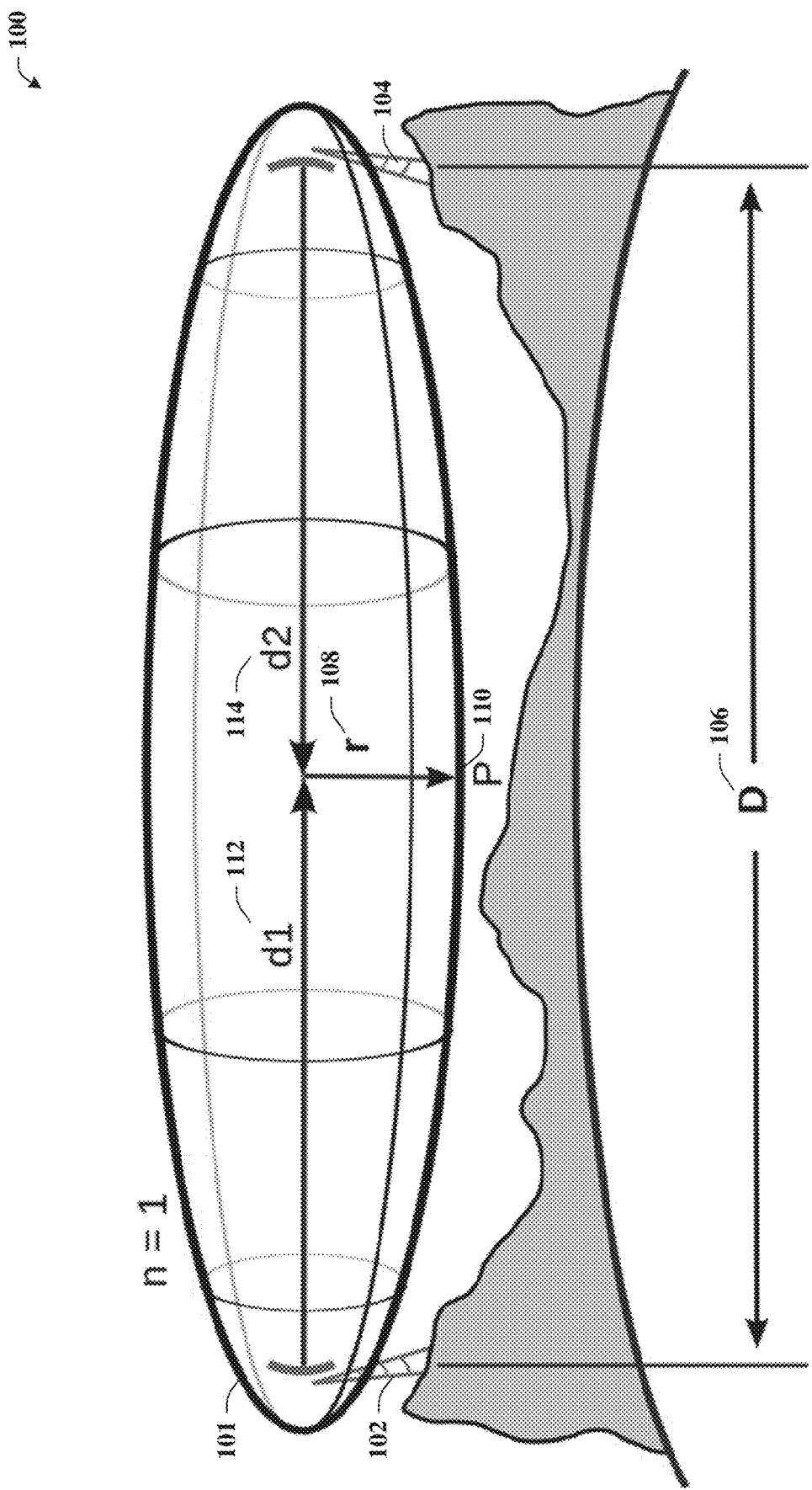
FIG. 1 depicts illustration 100 showing an example representation of a Fresnel zone in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with initial reference to FIG. 1, illustration 100 is depicted, showing an example representation of Fresnel zone 101 in accordance with certain embodiments of this disclosure. Fresnel zone 101 can represent one in a series of confocal prolate ellipsoidal regions of space between an around two transceivers, such as transceivers 102 and 104 situated some distance 106, denoted D, away from one another. In this case, n=1 indicates that Fresnel zone 101 is the first in the series of Fresnel zones, but it is appreciated that any one of the series may be used (e.g., n=2, n=3, . . . ) in accordance with the disclosed subject matter.

Transmitted radio waves can follow slightly different paths before reaching a receiver, especially if there are obstructions or reflecting objects between the two transceivers 102 and 104. The radio waves can arrive at slightly different times and can be slightly out of phase due to the different path lengths. Depending on the magnitude of the phase shift, the waves can interfere constructively or destructively. The size of the calculated Fresnel zone at any particular distance from the transmitter (e.g., transceiver 102) and receiver (e.g., transceiver 104) can help to predict whether obstructions or discontinuities along the path will cause significant interference. Hence, determining whether objects exist within a Fresnel zone can be an important part of network planning.

Fresnel zone 101 can have radius 108, denoted r, which varies according to distances from the two transceivers 102 and 104. For example, at point 110, denoted as P, distance 112 (e.g., d1) away from first transceiver 102 and distance 114 (e.g., d2) away from second transceiver 104 are approximately equal. Thus, at point 110, radius 108 is at a maximum value. It is appreciated that network planning based on Fresnel zone data can be more accurate and/or more robust than network planning based on LoS data alone.

Thus, conventional network planning typically involves inputting locations for the two transceivers 102 and 104 and attempting to determine whether there are any obstructions not only to the LoS between the two transceivers, but also within the Fresnel zone. Typically, the above is done based on access to a geospatial model of the physical environment. Some test buffer around the LoS is selected and then the geospatial model is accessed to determine whether there are objects (e.g., potential obstructions) within that test buffer. If so, those objects are tested against a clearance buffer (e.g., the Fresnel zone).

For Fresnel zones, the width of the clearance buffer at each point on the LoS connecting the transceivers is a function of the transmission frequency, the distance to the receiver and the distance to the transmitter. A clearance test examines that there are no obstacles in the space defined by the Fresnel zone. In a typical clearance test, two locations of transceivers are provided as points in a 3D space. The straight line that connects these points is the LoS and the clearance buffer is the space defined by the Fresnel zone according to the frequency of the transmission. One goal is to test that there are no obstructions that intersect this space When planning large networks, there is a need to deploy many transceivers; so many LoS computations are required. To automate the process and assist network planners, a clearance test can be executed over a 3D model of the world. That is, given a 3D model of a physical space, with all the potential obstacles (like buildings, trees, and the terrain), the computation is by examining that no obstacles intersect the clearance buffer defined by the Fresnel zone. It is appreciated that the 3D model can be representative of any spatial reference system, including any world geodedic coordinate system such as European Petroleum Survey Group (EPSG): 4326, EPSG:3857, or other.

A naïve test could be by applying an intersection test to each one of the objects in the dataset (e.g., an infinite test buffer). But this is inefficient and does not scale. A spatial index can be used to improve the efficiency of the computation by retrieving a small set of relevant objects (e.g., a finite test buffer) and applying the intersection test just to those. In other words, the clearance buffer represents the Fresnel zone and therefore objects within can be obstructions to the signal. On the other hand, the test buffer represents a region of the virtual model from which a smaller set of objects are identified or selected on which to perform the clearance test.

Figure 2A:
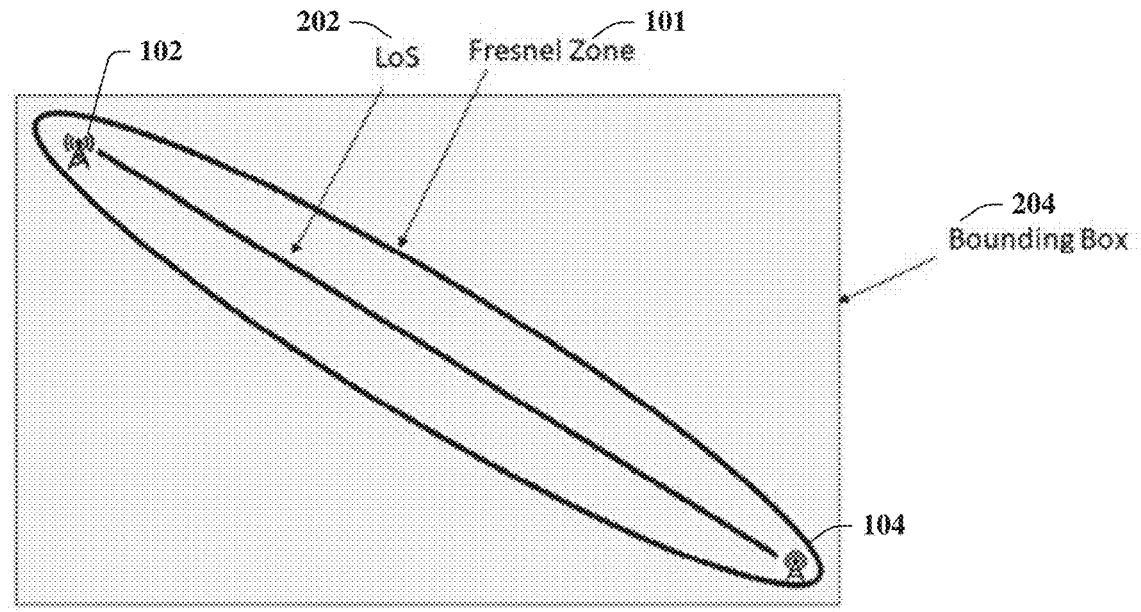
FIG. 2A shows illustration 200A depicting an example of a bounding box approach.
Figure 2B:
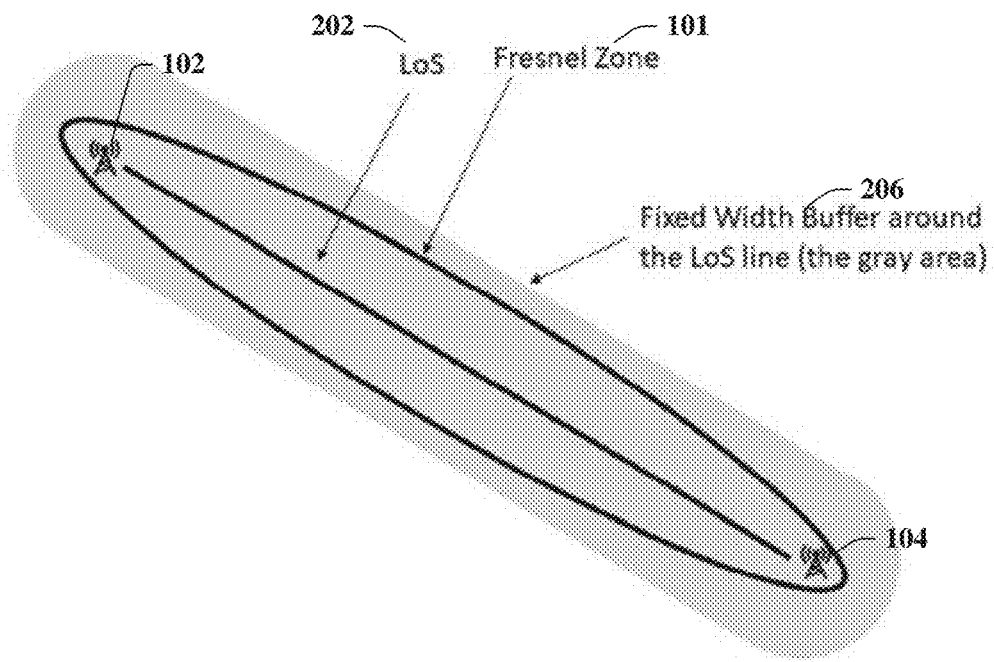
FIG. 2B shows illustration 200B depicting an example of a fixed-width approach.

As such, the test buffer (also referred to as simply "buffer") selected can have significant consequences on the computational resources needed to perform various clearance tests, particularly if results are to be determined in real-time, such as in connection with a network planning application on a device in the field. The importance of utilizing an efficient test buffer can be further demonstrated by examining two contrasting conventional approaches, referred to herein as the bounding box approach illustrated at FIG. 2A and the fixed-width approach illustrated at FIG. 2B. Examination of these two distinct approaches can reveal advantages and disadvantages with both.

Illustration 200A depicts transceivers 102 and 104, connected by LoS 202 in accordance with certain embodiments of this disclosure. These elements are enveloped by Fresnel zone 101. It is noted that objects that intersect Fresnel zone 101 (e.g., the clearance buffer) are likely to interfere with a signal between transceivers 102 and 104.

A bounding box approach selects a bounding box 204 that includes both transceivers 102 and 104. As such, the total area of bounding box 204 is a function of the angle between transceivers (relative to some cardinal direction). As illustrated, this angle is approximately 30 degrees in this example. However, it can be readily visualized that if the angle was zero degrees (e.g., horizontal or vertical), then the area of the bounding box is minimized and most closely approximate Fresnel zone 101, whereas at 45 degrees, the area is maximized.

It is observed that one strength of the bounding box approach is that because bounding box 204 is aligned with the cardinal directions of the physical space (e.g., the Earth) and/or the geospatial coordinate system of the virtualized model of the physical space, the calculations for the clearance test can be very efficient. One potential weakness, however, is when LoS 202 is not aligned with one of the cardinal directions, the area of bounding box 204 becomes much larger than the Fresnel zone. Such can lead to an excessive number of objects being selected on which to run clearance tests, and thus decreases the effectiveness and scalability of the system.

In other words, the bounding box approach is fast and efficient in terms of performing clearance tests against objects retrieved from the data store, but extremely inefficient due to the excessive size of bounding box 204 relative to Fresnel zone 101. This size disparity causes a much greater number of objects to be retrieved from the data store, each one relying on clearance tests to be performed. So, more efficient clearance testing, but more clearance tests performed.

In contrast, the fixed-width approach, depicted by illustration 200B, relies on a fixed-width buffer 206 that is fixed to be equal to or greater than the diameter of Fresnel zone 101. Such a test buffer typically has a very small size, irrespective of the angle of LoS 202. Therefore, fewer objects will be retrieved from the data store upon which to perform the clearance test, which is an advantage. However, because the fixed-width buffer 206 is aligned with the angle of LoS 202 instead of with geospatial cardinal directions (as with the bounding box approach), the clearance test computations cannot be performed the same way. Rather, testing that the clearance buffer contains a given objects or intersects with a given object relies on computation of the distance between the object and the shape (e.g., LoS 202) for which the buffer is defined. This distance computation is typically expensive, especially for large datasets.

Hence, whereas the bounding box approach produces inexpensive clearance tests, but many more clearance tests, the fixed-width approach produces fewer clearance tests, but more expensive testing per object. Due to the potential disadvantages of both these approaches, neither one is suitably scalable nor efficient.

In order to remedy potential shortcomings of conventional approaches, a new technique for selecting a test buffer is proposed. For example, a 2D test buffer around LoS 202 can be defined in such a way that this buffer will contain all the objects that may intersect the clearance buffer (e.g., the Fresnel zone). In some embodiments, while the test buffer can rely on a 2D representation of the physical space, the clearance buffer can rely on a 3D representation for intersection testing. The 2D buffer refers to latitude and longitude (e.g., x-axis and y-axis coordinates) and can ignore the height (e.g., z-axis coordinates) of the objects in order to facilitate rapid object retrieval. Retrieving using an index of only the objects in the buffer can significantly decrease the number of intersection tests the system performs. Such can therefore increase the efficiency and scalability of the system. In some embodiments, such can be applied with any spatial index including a grid index, kd-tree, R-tree, quad tree, GiST index and so on.

While such indexing can provide rapid and efficient retrieval, there is still the question of how to efficiently define the test buffer that determines which indexed objects are to be retrieved from the data store and on which to perform clearance testing. As noted above, other solutions such as the bounding box approach and the fixed-width approach each have distinct shortcomings because the former tends to retrieve an excessive number of objects to be tested, while the latter tends to cause the clearance testing to be more expensive in terms of computational resources used to perform the clearance testing.

In accordance with the disclosed subject matter, it is proposed to use a testing buffer that is made of variable size rectangles. These rectangles can, in sequence, cover LoS 202 and Fresnel zone 101. Thus, any object that intersects Fresnel zone 101 must also intersect at least one of the rectangular shapes that constitute the buffer. An example of the proposed rectangular shapes used to form the test buffer can be found at FIGS. 4A and 4B.

It will become apparent that a test buffer built from many individual rectangle shapes (as opposed to just one associated with previous approaches) can lead to several advantages. For example, the test buffer is tight in the sense that the area covered by the rectangles does not contain large spaces outside the Fresnel zone as is the case for the bounding box approach. As another example, because the rectangles are individually aligned according to a cardinal direction, for each rectangle, a clearance test is similar to that of the bounding box approach, so it is extremely fast like the bounding box, but without the disadvantages of the bounding box approach.

As yet another advantage, the proposed techniques support adaptive changes to positions of the transceivers 102 or 104. In the case of a relatively small movement of a transceiver 102 or 104, it is possible to compute the difference and retrieve just the newly added objects from the rectangles that represent the change, which is further detailed in connection with FIG. 5B. Other advantages will become apparent upon review of the remainder of this specification.

Example Systems

Figure 3:
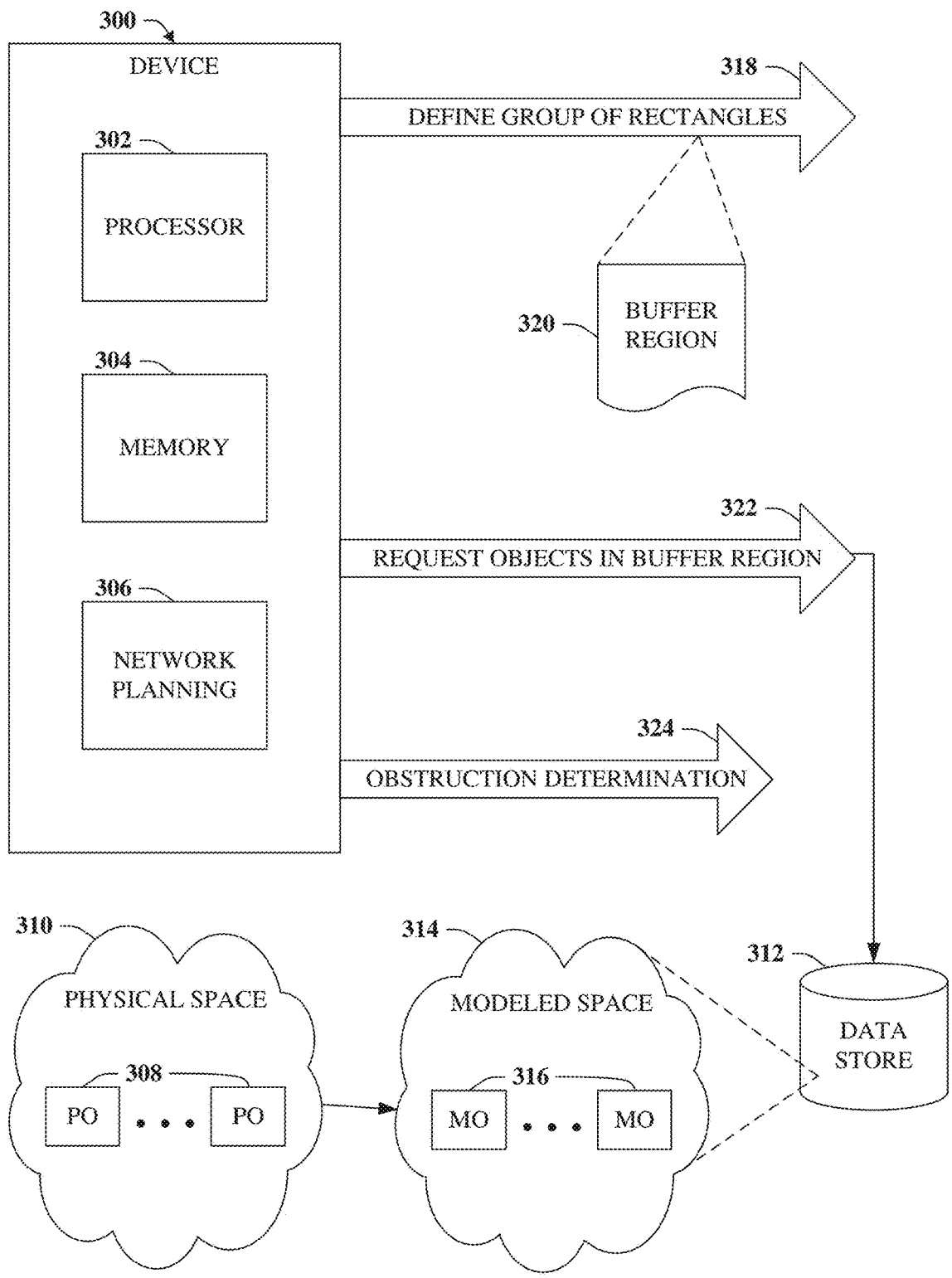
FIG. 3 illustrates a block diagram of an example system or device that can perform a network planning operation based on a group of defined rectangles representing a test buffer in accordance with certain embodiments of this disclosure.

Referring now to FIG. 3, device 300 is depicted. Device 300 can perform a network planning operation based on a group of defined rectangles representing a test buffer in accordance with certain embodiments of this disclosure. Device 300 can comprise a processor 302 that can be specifically configured to perform a network planning procedure in connection with a physical space and a memory 304 that stores executable instructions that, when executed by the processor, facilitate performance of operations. Device 300 can comprise network planning component 306 that can be specifically tailored to perform network planning operations. Processor 302 can be a hardware processor having structural elements known to exist in connection with processing units or circuits, with various operations of processor 302 being represented by functional elements shown in the drawings herein that can require special-purpose instructions, for example stored in memory 304 and/or network planning component 306. Along with these special-purpose instructions, processor 302 and/or device 300 can be a special-purpose device. Further examples of the memory 304 and processor 302 can be found with reference to FIG. 10. It is to be appreciated that device 300 or computer 1002 can represent a server device of a communications network or a user equipment device and can be used in connection with implementing one or more of the systems, devices, or components shown and described in connection with FIG. 3 and other figures disclosed herein.

As introduced above, device 300 and/or processor 302 can be configured to perform a network planning procedure that tests whether physical object(s) 308 of a physical space 310 might potentially obstruct a signal between two transceivers 102 and 104 situated in the physical space 310. Such can be accomplished based on access to a data store 312 that can comprise a virtual model (e.g., modeled space 314) of the physical space 310 and can include modeled objects 316 that model physical objects 308. Further operations performed by device 300 and/or processor 302 can comprise the following.

Figure 4A:
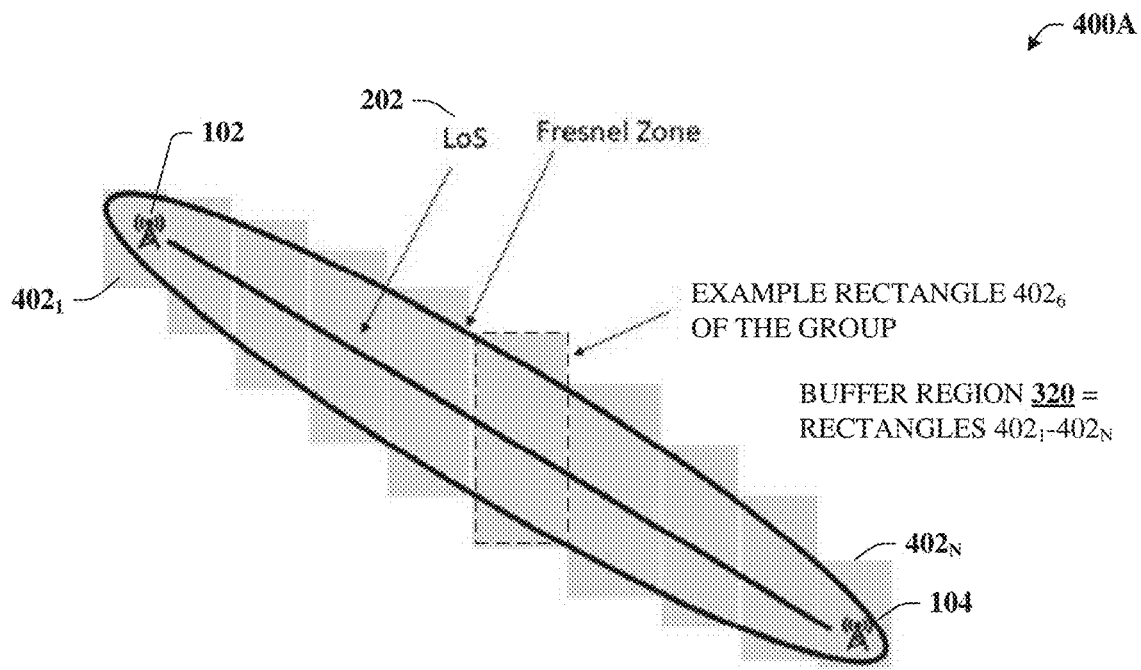
FIG. 4A shows illustration 400A depicting an example of the buffer region that is composed of a group of rectangles in accordance with certain embodiments of this disclosure.
Figure 4B:
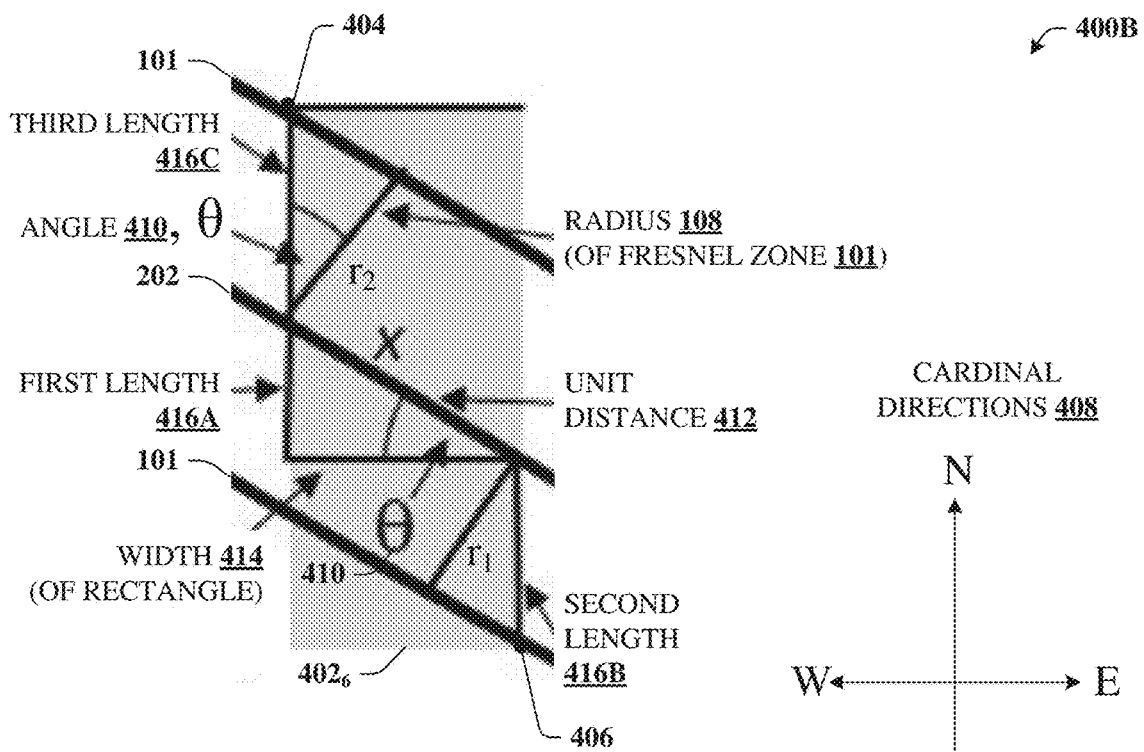
FIG. 4B shows illustration 400B depicting an example of one of the rectangles in the context of cardinal directions in further detail in accordance with certain embodiments of this disclosure.

While still referring to FIG. 3, but turning as well to FIGS. 4A and 4B, illustration 400A depicts an example of the buffer region that is composed of a group of rectangles in accordance with certain embodiments of this disclosure; and illustration 400B depicts an example of one of the rectangles in the context of cardinal directions in further detail in accordance with certain embodiments of this disclosure.

As illustrated at reference numeral 318 of FIG. 3, device 300 can define a group of rectangles. This group of rectangles (an example of which is indicated in FIG. 4A as rectangles $402_1$-$402_N$) can be situated along a LoS (e.g., LoS 202) between two transceivers (e.g., transceivers 102 and 104). In combination, the group of rectangles 402 can represent buffer region 320 (e.g., an improved test buffer) that encompasses a Fresnel zone (e.g., Fresnel zone 101) of the two transceivers. In other words, buffer region 320 can reflect the summation of the areas of the group of rectangles $402_1$-$402_N$.

Advantageously, a rectangle (e.g., rectangle $402_6$) of the group of rectangles $402_1$-$402_N$ can be oriented to align with cardinal directions 408 of physical space 310 independent of an angle 410 (e.g., θ) of LoS 202 relative to one of the cardinal directions 408. It is appreciated that angle 410 can be assumed to be between zero and 45 degrees. Otherwise, the same computations can be performed by merely appropriately rotating to a different of the four cardinal directions 408. Furthermore, attention is drawn to the top-left corner of rectangle $402_6$ (as depicted in illustration 400B), denoted point 404 and the bottom-right corner, denoted 406. Points 404 and 406 are either upon or just narrowly outside the boundaries of Fresnel zone 101, illustrating that the entirety of Fresnel zone 101 is encased by rectangles 402 and/or there are no points within Fresnel zone 101 that are not also within buffer region 320.

Device 300 can further request objects in buffer region 320, which is illustrated at reference numeral 322. Such can comprise requesting from data store 312 modeled object(s) 316 that are determined to be in buffer region 320. Recall buffer region 320 represents a combination of the group of rectangles 402 that, in combination, are guaranteed to include all objects in Fresnel zone 101, as illustrated by points 404 and 406. It is noted that while other solutions also attempt to retrieve objects within a test buffer, other solutions use a test buffer that is very different from buffer region 320 and therefore do not realize the benefits of relying on buffer region 320, which can be significantly smaller and equally as fast per test as the bounding box approach; and equally small, but significantly faster per test than the fixed-width approach.

As illustrated at reference numeral 324, device 300 can determine whether the signal is obstructed based on the modeled object(s) 316 that were received from data store 312. It is appreciated that the modeled object(s) 316 will potentially differ from those retrieved by other solutions, as other solutions rely on test buffers having different shapes/sizes than buffer region 320.

It is appreciated that while modeled space 314 can be a 3D space, in some embodiments, Fresnel zone 101, rectangles 402, and other elements detailed herein can be 2D elements. Such can be accomplished by simply ignoring the z-coordinate (e.g., height/elevation) and using only the x and y coordinates, resulting in a 2D projection onto the earth. Thus, determining which object to retrieve from modeled space 314 can be determined based on the 2D projection.

Still referring to FIGS. 4A and 4B, illustration 400A shows, by way of example, ten individual rectangles $402_1$-$402_N$, where N is ten. However, it is appreciated that N can be any natural number greater than one. Thus, device 300 can in some embodiments, determine the number, N, of rectangles based on various factors or conditions. For example, in some embodiments, N can be determined as a function of a distance between two transceivers (e.g., distance 106, D) and a unit distance 412. Unit distance 412, illustrated as, x, shown in illustration 400B can be representative of a defined distance along LoS 202. As one example, unit distance 412 can be 100 meters. Regardless, N can be determined as distance 106, D, divided by unit distance 412, x, in some embodiments.

As is appreciated, the number, N, of rectangles 402 can affect the operations of the network planning procedure and N can be controlled by unit distance 412, x. Furthermore, the width 414 of a given rectangle can be determined as a function of unit distance 412. Hence, each rectangle 402 can have a constant width 414, which can be a function of unit distance 412. In some embodiments, width 414 of rectangle(s) 402 can be a function of the unit distance and a cosine of angle 410 of LoS 202 relative to one of the cardinal directions 408. For example, w=x*cos(θ).

Thus, unit distance 412, x, can be an interesting parameter to tweak the operation for different implementation criteria or the like. As noted, unit distance 412 can be implemented as a default value (e.g., 100 meters) in some embodiments, while, in other embodiments, unit distance 412 can be input to device 300. In either case, it is appreciated that unit distance 412 can be an adjustable parameter.

Even though width 414 can be constant for each of the many rectangles 402, the length 416 of each rectangle 402 can vary because a radius 108 of Fresnel zone 101 varies over the span of LoS 202. For example, a respective length 416 of a given rectangle 402 varies based on a location along the LoS 202 in response to variances in a radius 108 of the Fresnel zone at different locations along LoS 202.

As illustrated, in some embodiments, length 416 can be a combination of three separate portions of a given rectangle 402. For example, length 416 can be the sum of first length 416A, second length 416B, and third length 416C. In some embodiments, first length 416A can be x*sin(θ). In some embodiments, second length 416B can be r1/cos(θ), where r1 is a radius of Fresnel zone 101 at a position along LoS 202 of a right side of rectangle 402. In some embodiments, third length 416Bc can be r2/cos(θ), where r2 is a radius of Fresnel zone 101 at a position along LoS 202 of a left side of rectangle 402.

Figure 5A:
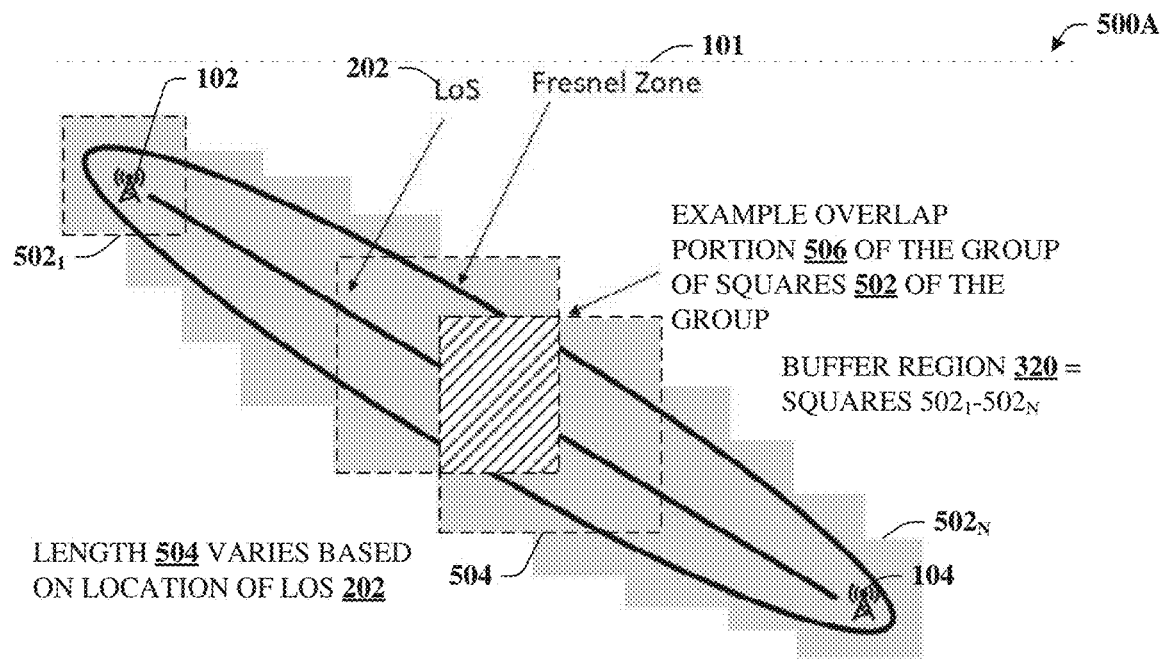
FIG. 5A shows depiction 500A illustrating an alternative embodiment in which the buffer region is composed of a number of squares in accordance with certain embodiments of this disclosure.

Referring now to FIG. 5A, depiction 500A is presented. Depiction 500A illustrates an alternative embodiment in which the buffer region is composed of a number of squares in accordance with certain embodiments of this disclosure. It is observed that a square is a specific type of rectangle, one in which length and width are equal. Thus, buffer region 320 composed of a group of squares 502 yields some differences. For example, a respective side, both length and width (illustrated as length 504), of a square 504 can change according to a position of the respective square 502 along LoS 202. Recall from the previous rectangle example, a respective width 414 of each rectangle 402 is constant, whereas only the length 416 varied according to position along LoS 202.

Hence, whereas the rectangle embodiment typically has no overlapping between individual rectangles 402, the square embodiment can have overlapping portions 506, which is illustrated by the diagonal lines. In some cases, this square shaped embodiment can simplify the computations of the rectangle dimensions.

Figure 5B:
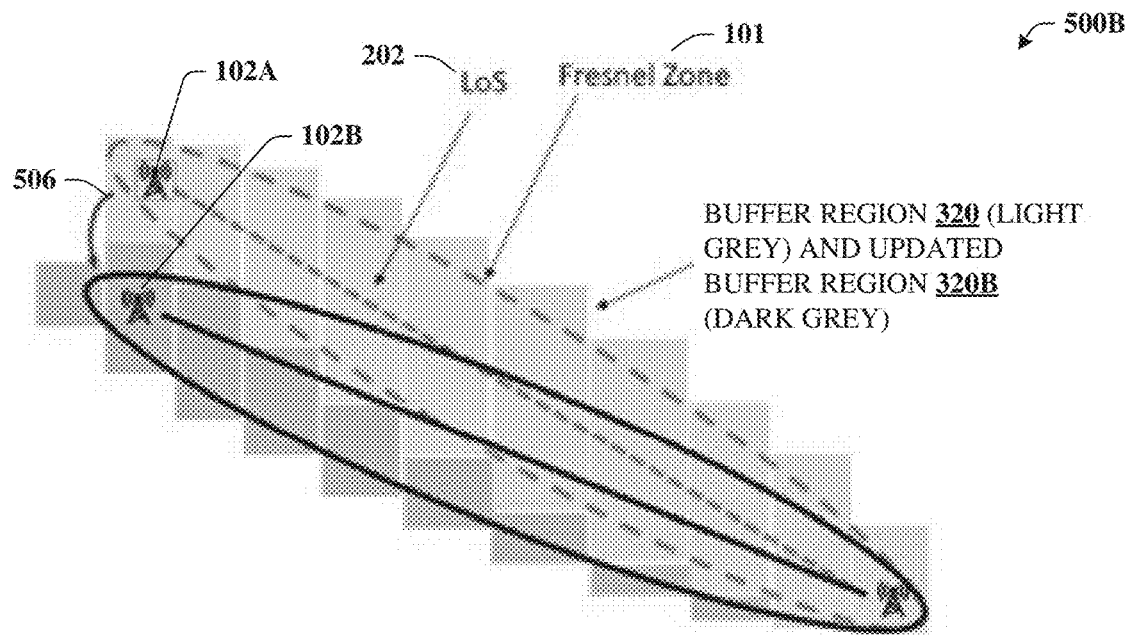
FIG. 5B shows depiction 500B illustrating an example of performing updated computations in response to an update to a position of one of the two transceivers in accordance with certain embodiments of this disclosure.

Turning now to FIG. 5B, depiction 500B is presented. Depiction 500B illustrates an example of performing updated computations in response to an update to a position of one of the two transceivers in accordance with certain embodiments of this disclosure. For example, consider that device 300 receives an update to a position of one of the two transceivers 102 or 104, for instance via a user interface of device 300. Such is illustrated as update 506 that moves transceiver 102 from position 102A to position 102B.

Consider that results can have already been returned based on the transceiver being at position 102A. As such, only objects determined to be in updated buffer region 320B need be retrieved from data store 312 and tested, as other objects have already been retrieved and tested. In other words, based on update 506, device 300 can determine updated buffer region 320B to exclude regions of buffer region 320 from which modeled objects 316 were previously retrieved.

Thereafter, device 300 can request from data store 312 additional objects. These additional objects can be representative of physical objects 308 of physical space 310 that are determined to be in updated buffer region 320B, while exclusive of the modeled objects 316 determined to be in buffer region 320. Device 300 can then determine whether the signal is likely to be obstructed based on the additional modeled objects received from data store 312 in response to update 506 to the position of transceiver 102.

Example Methods

Figure 6:
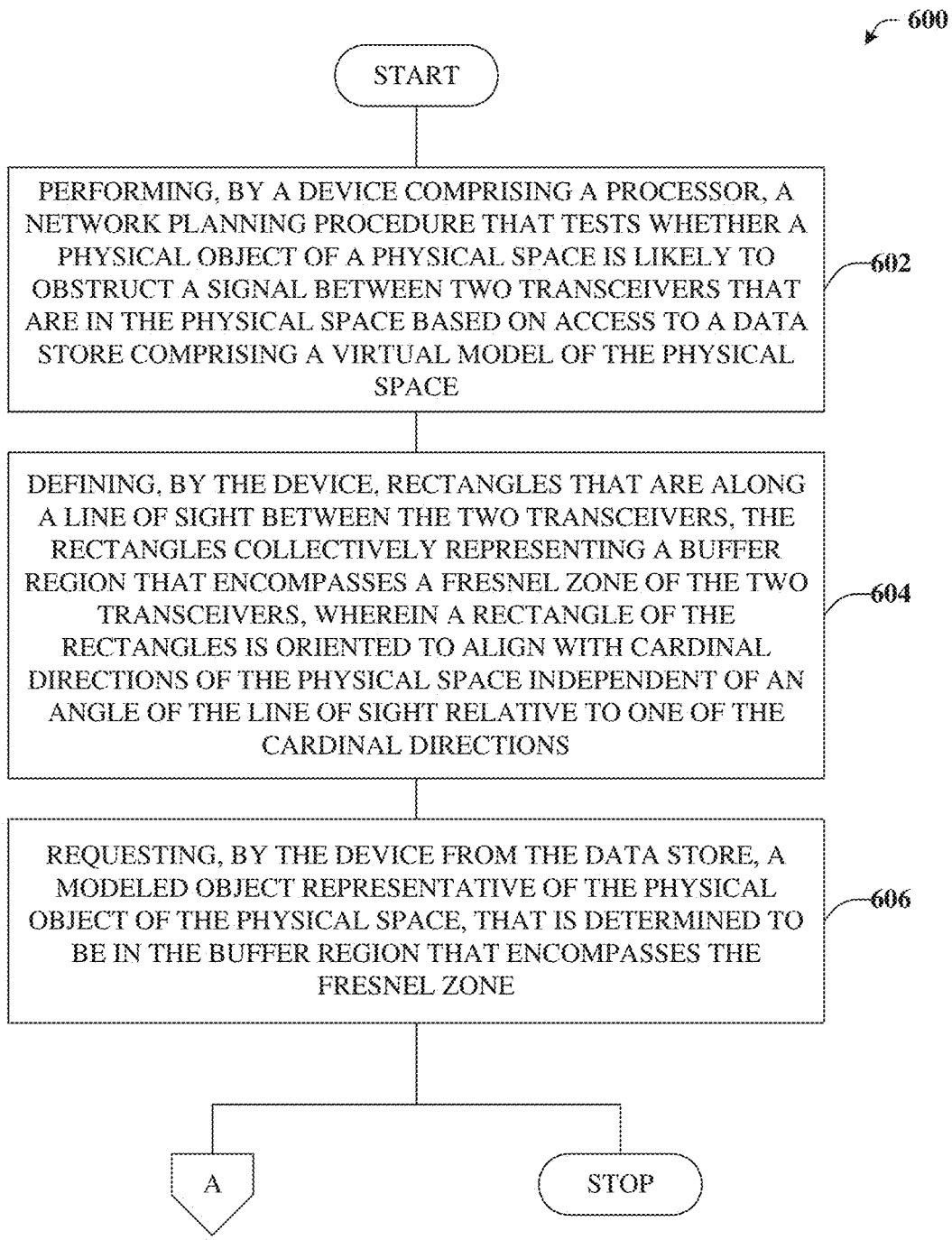
FIG. 6 illustrates an example method that can perform a network planning operation based on a group of defined rectangles representing a test buffer in accordance with certain embodiments of this disclosure.
Figure 7:
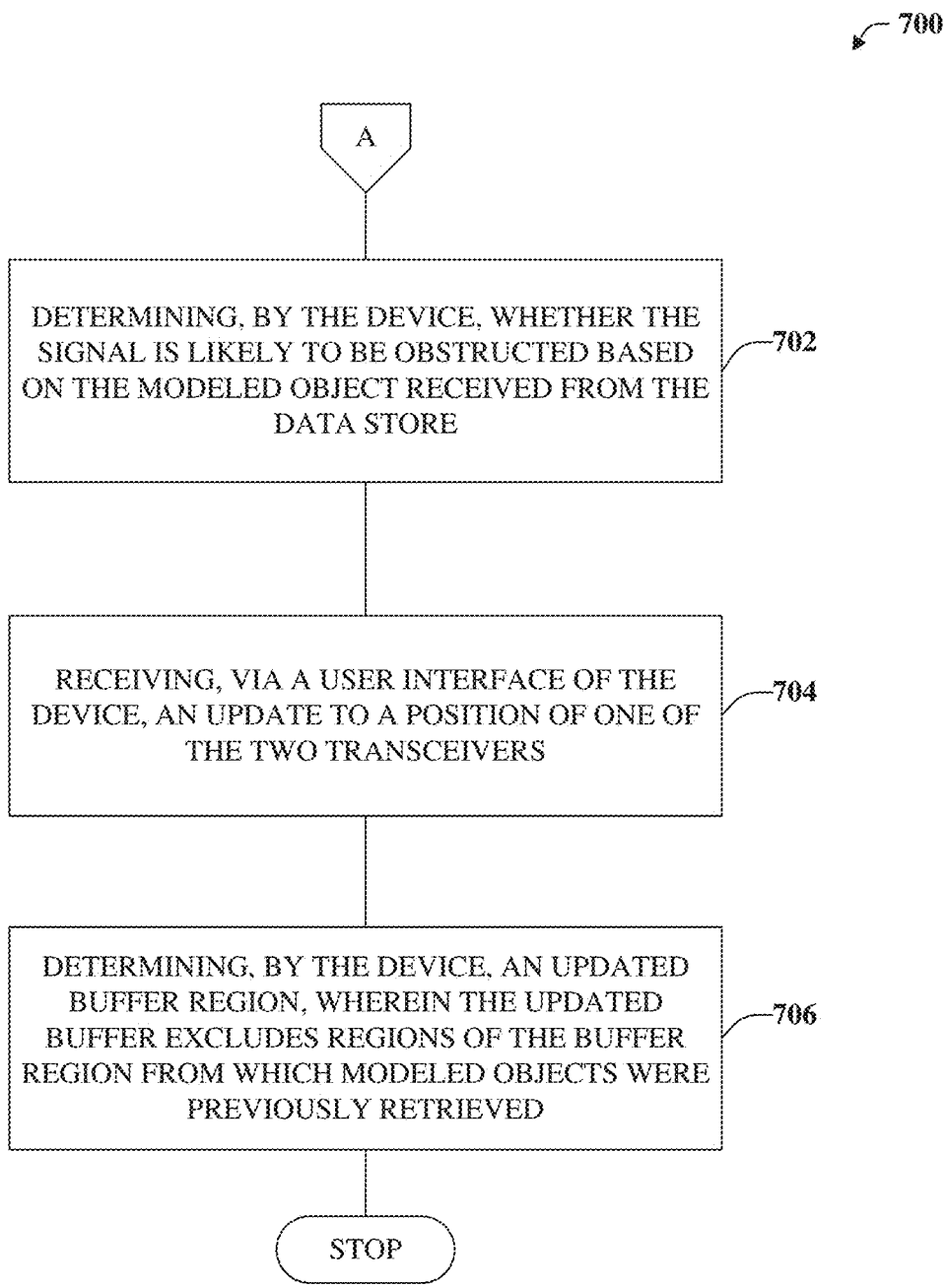
FIG. 7 illustrates an example method that can provide for additional elements or aspects in connection with performing a network planning procedure based on a group of defined rectangles representing a test buffer in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can perform a network planning operation based on a group of defined rectangles representing a test buffer in accordance with certain embodiments of this disclosure. For example, at reference numeral 602, a device comprising a processor can perform a network planning procedure. The network planning procedure can test whether a physical object of a physical space obstructs a signal between two transceivers positioned in the physical space. This test can be based on access to a data store comprising a virtual model (e.g., a modeled space) of the physical space.

At reference numeral 604, the device can define rectangles that are positioned along a line of sight between the two transceivers. These rectangles can, collectively, represent a buffer region that encompasses a Fresnel zone of the two transceivers. A rectangle of the rectangles can be oriented to align with cardinal directions of the physical space independent of an angle of the line of sight relative to one of the cardinal directions. In other words, the rectangle is not oriented according to the line of sight (e.g., as for the fixed-width approach), but rather based on the cardinal directions, which can improve the computational efficiency of subsequent clearance tests given the modeled space is typically compiled relative to cardinal directions of the corresponding physical space (e.g., latitude, longitude, etc.).

At reference numeral 608, the device can receive, from the data store, a modeled object representative of the physical object of the physical space. This modeled object can be received in response to being determined to be in the buffer region that encompasses the Fresnel zone. Method 600 can stop or proceed to insert A, which is further detailed in connection with FIG. 7.

With reference now to FIG. 7, exemplary method 700 is illustrated. Method 700 can provide for additional elements or aspects in connection with performing a network planning procedure based on a group of defined rectangles representing a test buffer in accordance with certain embodiments of this disclosure. For example, at reference numeral 702, the device determines whether the signal is likely to be obstructed based on the modeled object received from the data store.

At reference numeral 704, the device can receive, via a user interface of the device, an update to a position of one of the two transceivers. At reference numeral 706, the device can determine an updated buffer region. The updated buffer region excludes portions of the buffer region from which modeled objects were previously retrieved.

Example Operating Environments

Figure 8:
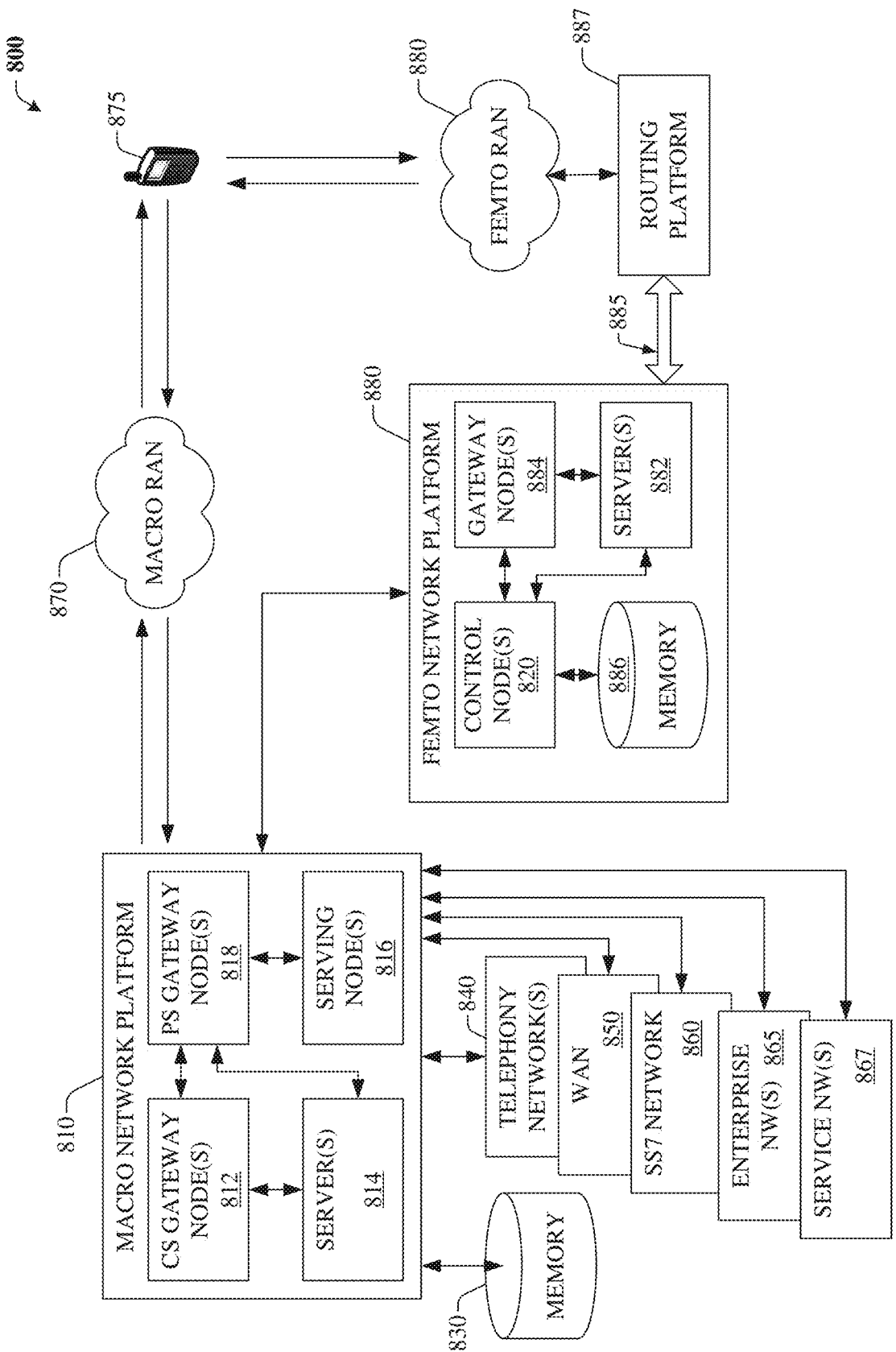
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication with, user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 887 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN1370 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s)1318 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example, operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
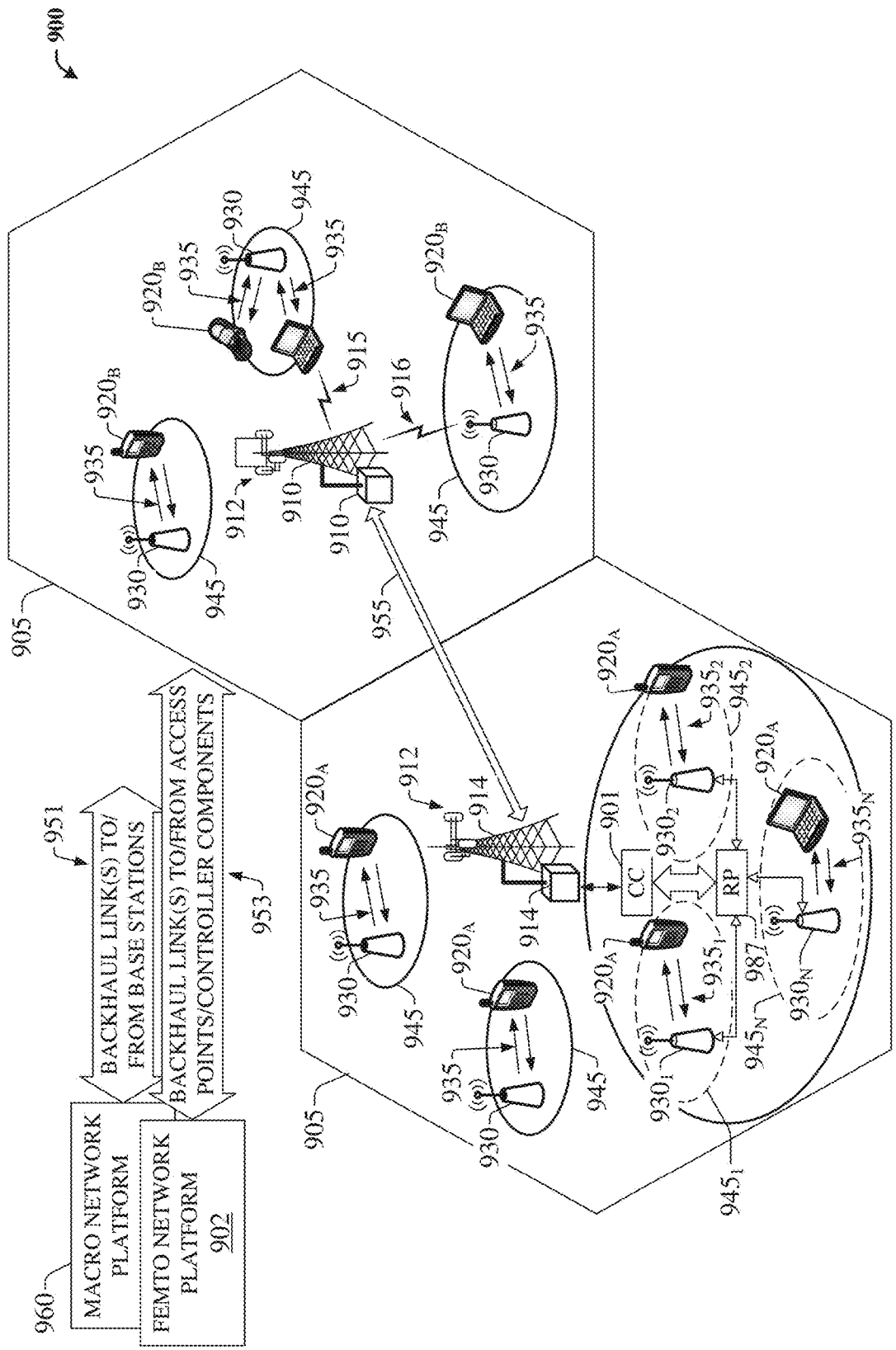
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE 920$_A$, 920$_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE 920$_A$, 920$_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., LoS or non-LoS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs 920$_A$ can be routed by the RP 987, for example, internally, to another UE 920$_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $9^4$-$10^7$ femto APs 930 per base station 910. According to an aspect, a set of femto access points 930$_1$-930$_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE 920$_A$ connected to femto APs 930$_1$-930$_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas $912_1$-$912_N$. It should be appreciated that while antennas $912_1$-$912_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
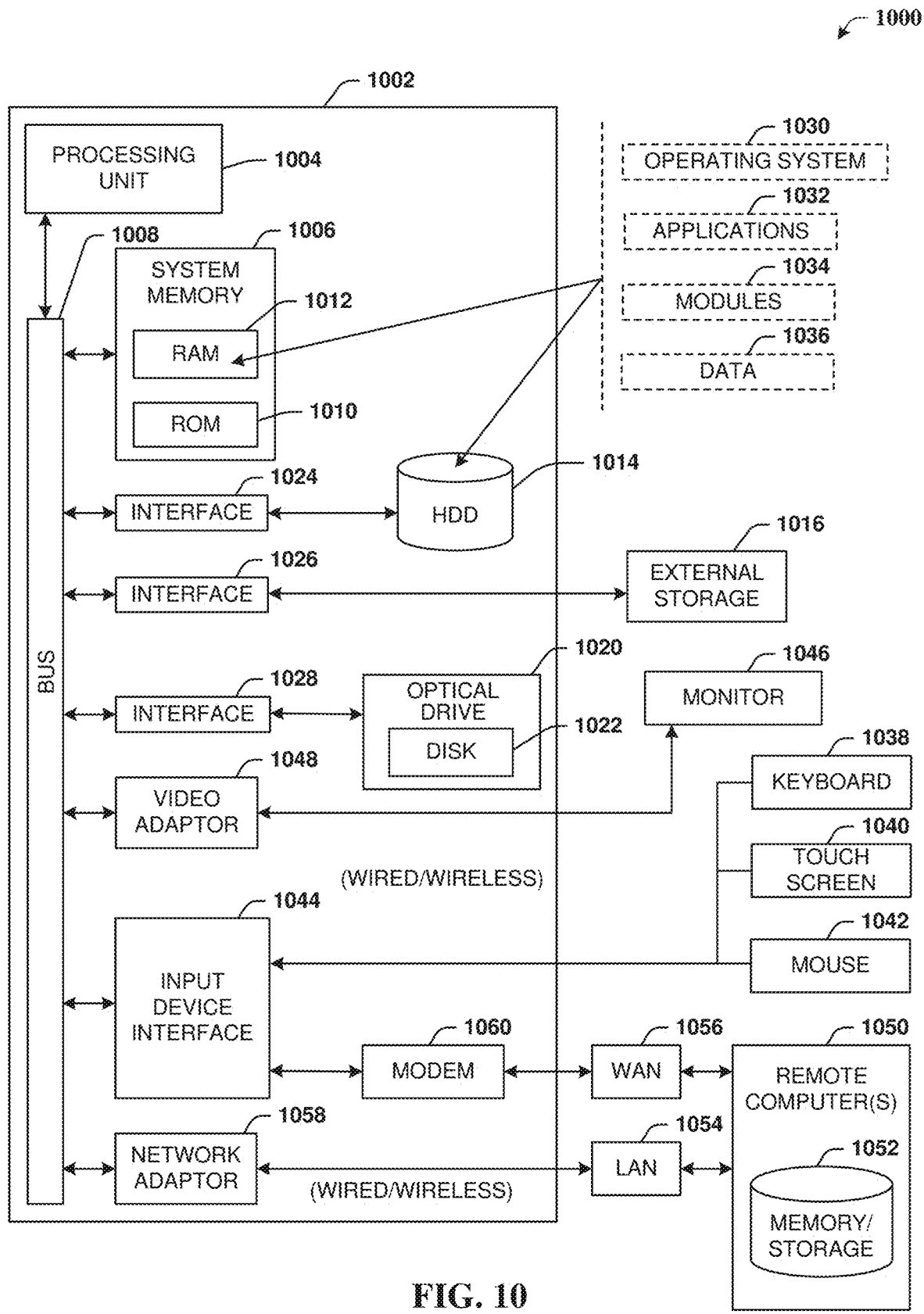
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN)

1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
   a processor configured to perform a network planning procedure that tests whether physical objects of a physical space obstruct a signal between two transceivers situated in the physical space based on access to a data store comprising a virtual model of the physical space; and
   a memory that stores executable instructions that, when executed by the processor, facilitate performance of operations, comprising:
      defining a group of rectangles that are situated along a line of sight between the two transceivers, and that, in combination, represent a buffer region that encompasses a Fresnel zone of the two transceivers, wherein a rectangle of the group of rectangles is oriented to align with cardinal directions of the physical space independent of an angle of the line of sight relative to one of the cardinal directions;
      requesting from the data store modeled objects, representative of the physical objects of the physical space, that are determined to be in the buffer region, representing a combination of the group of rectangles, which encompasses the Fresnel zone; and
      determining whether the signal is obstructed based on the modeled objects received from the data store.

2. The device of claim 1, wherein a number of rectangles in the group of rectangles is a natural number greater than one, and wherein the operations further comprise determining the number of rectangles as a function of a distance between the two transceivers and a unit distance representative of a defined distance along the line of sight.

3. The device of claim 2, wherein the operations further comprise receiving a value of the unit distance in response to input to the device.

4. The device of claim 2, wherein the unit distance is 100 meters.

5. The device of claim 2, wherein the rectangle of the group of rectangles has a width that is a function of the unit distance and a cosine of the angle of the line of sight relative to one of the cardinal directions.

6. The device of claim 2, wherein a respective width of rectangles of the group of rectangles is a function of the unit distance, which is constant for the rectangles, and wherein a respective length of the rectangles varies based on a location along the line of sight in response to variances in a radius of the Fresnel zone at different locations along the line of sight.

7. The device of claim 2, wherein the rectangle of the group of rectangles has a length that is a function of the unit distance and a sine of the angle of the line of sight relative to one of the cardinal directions, and further a function of a radius of the Fresnel zone at a location of the rectangle and a cosine of the angle of the line of sight relative to one of the cardinal directions.

8. The device of claim 1, wherein the rectangle of the group of rectangles does not overlap any other rectangle of the group of rectangles.

9. The device of claim 1, wherein the group of rectangles are a group of squares, and wherein a length of a side of a respective square of the group of squares changes according to a position of the respective square along the line of sight.

10. The device of claim 9, wherein the square of the group of squares overlaps at least some portion of a different square of the group of squares.

11. The device of claim 1, wherein the operations further comprise:
    receiving, via a user interface of the device, an update to a position of one of the two transceivers; and
    based on the update, determining an updated buffer region, wherein the updated buffer excludes regions of the buffer region from which modeled objects were previously retrieved.

12. The device of claim 11, wherein the operations further comprise:
    requesting from the data store additional modeled objects, representative of the physical objects of the physical space, that are determined to be in the updated buffer region, while being exclusive of the modeled objects determine to be in the buffer region; and
    determining whether the signal is likely to be obstructed based on the additional modeled objects received from the data store in response to the update to the position of the one of the two transceivers.

13. A non-transitory machine-readable medium, comprising executable instructions that, when executed by a processor, facilitate performance of operations, comprising:
    performing a network planning procedure that tests whether a physical object of a physical space obstructs a signal between two transceivers positioned in the physical space based on access to a data store comprising a virtual model of the physical space;
    defining rectangles that are positioned along a line of sight between the two transceivers, the rectangles collectively representing a buffer region that encompasses a Fresnel zone of the two transceivers, wherein a rectangle of the rectangles is oriented to align with cardinal directions of the physical space independent of an angle of the line of sight relative to one of the cardinal directions; and
    receiving, from the data store, a modeled object representative of the physical object of the physical space, which is determined to be in the buffer region that encompasses the Fresnel zone.

14. The non-transitory machine-readable medium of claim 13, wherein a respective width of the rectangles is constant and a respective length of the rectangles vary based on a location along the line of sight.

15. The non-transitory machine-readable medium of claim 13, wherein the rectangles have a respective width that is a function of a defined unit distance and a cosine of the angle of the line of sight relative to one of the cardinal directions.

16. The non-transitory machine-readable medium of claim 15, wherein the rectangles have a respective length that is a function of the defined unit distance, a sine of the angle of the line of sight relative to one of the cardinal directions, and a function of a radius of the Fresnel zone and a cosine of the angle of the line of sight relative to one of the cardinal directions.

17. A method, comprising:
    performing, by a device comprising a processor, a network planning procedure that tests whether a physical object of a physical space is likely to obstruct a signal between two transceivers that are in the physical space based on access to a data store comprising a virtual model of the physical space;
    defining, by the device, rectangles that are along a two-dimensional projection of a line of sight between the two transceivers, the rectangles collectively representing a buffer region that encompasses a two-dimensional projection of a Fresnel zone of the two transceivers, wherein a rectangle of the rectangles is oriented to align with cardinal directions of the physical space independent of an angle of the line of sight relative to one of the cardinal directions; and requesting, by the device from the data store, a modeled object representative of the physical object of the physical space, that is determined to be in the buffer region that encompasses the two-dimensional projection of the Fresnel zone.

18. The method of claim 17, further comprising determining, by the device, whether the signal is likely to be obstructed based on the modeled object received from the data store.

19. The method of claim 18, further comprising receiving, via a user interface of the device, an update to a position of one of the two transceivers.

20. The method of claim 19, further comprising, determining, by the device, an updated buffer region, wherein the updated buffer region excludes portions of the buffer region from which modeled objects were previously retrieved.

* * * * *